US011048683B2

(12) United States Patent
Ackermann

(10) Patent No.: US 11,048,683 B2
(45) Date of Patent: Jun. 29, 2021

(54) DATABASE CONFIGURATION CHANGE MANAGEMENT

(71) Applicant: SAP SE, Walldorf (DE)

(72) Inventor: Erich Ackermann, Ladenburg (DE)

(73) Assignee: SAP SE, Walldorf (DE)

( * ) Notice: Subject to any disclaimer, the term of this patent is extended or adjusted under 35 U.S.C. 154(b) by 553 days.

(21) Appl. No.: 15/728,232

(22) Filed: Oct. 9, 2017

(65) Prior Publication Data

US 2019/0108253 A1 Apr. 11, 2019

(51) Int. Cl.
*G06F 16/23* (2019.01)
*G06F 16/215* (2019.01)

(52) U.S. Cl.
CPC ........ *G06F 16/2365* (2019.01); *G06F 16/215* (2019.01); *G06F 16/2358* (2019.01)

(58) Field of Classification Search
CPC . G06F 16/2365; G06F 16/215; G06F 16/2358
See application file for complete search history.

(56) References Cited

U.S. PATENT DOCUMENTS 5,870,765 A * 2/1999 Bauer .................... G06Q 10/10 707/610
7,228,319 B1 * 6/2007 Fuchs ................. G06F 16/1873
7,251,669 B1 * 7/2007 Arora .................. G06F 16/2329 707/695
8,738,706 B1 * 5/2014 Grieve .................. G06F 40/151 709/205
8,903,779 B1 * 12/2014 Holenstein .......... G06F 11/1469 707/685
10,216,820 B1 * 2/2019 Holenstein .......... G06F 16/2358
2006/0212487 A1 * 9/2006 Kennis ................... G06Q 10/10
2009/0177800 A1 * 7/2009 Gidron ................ H04L 67/1095 709/248
2009/0259661 A1 * 10/2009 Cragun ............... G06F 21/6218
2014/0101099 A1 * 4/2014 Driesen ................. G06F 16/273 707/610
2018/0089250 A1 * 3/2018 Collins ............... G06F 16/2343
2018/0131765 A1 * 5/2018 Puleston ............ G06K 7/10366
2019/0065327 A1 * 2/2019 Wei ..................... G06F 11/1451

* cited by examiner

*Primary Examiner* — Cam Y T Truong
(74) *Attorney, Agent, or Firm* — Erise IP, P.A.

(57) ABSTRACT

Systems and methods for providing a database having a plurality of standard configuration settings are presented. Requests corresponding to modifications to some or all of the standard configuration settings are monitored during customization of the database. A determination of whether the modifications are allowed is made. Based on the determination, a message comprising allowance or denial for each of the modifications is generated. Data characterizing allowed modifications is logged. The logged data is used to update the database when the standard configuration settings of the database change as part of a database upgrade. Data characterizing the allowed modifications is extracted from the logged data and used to generate differences between a newer version of the database and an older version of the database.

20 Claims, 7 Drawing Sheets

DATABASE CONFIGURATION CHANGE MANAGEMENT

TECHNICAL FIELD

The technology described herein relates generally to management of configuration changes to a database which enable such changes to be propagated to updated versions of such database.

BACKGROUND

Enterprise Resource Planning (ERP) systems integrate software applications that companies use to run their day-to-day businesses. Data from the software applications for different business activities, e.g. human resources or finance, can be stored in a shared database. The integrated and centralized nature of the ERP system environment allows a business to achieve better data accuracy, reduction of redundant tasks, better standardization of tasks, and more agility in making business decisions.

A business may desire a customized version of an ERP system to meet its own business needs. In order to achieve this customization, the ERP system must allow users, for example, Information Technology (IT) personnel, to make configuration changes to the ERP system that achieve the business needs.

Traditional ERP systems provided for manual provisioning and configuration of computing environments. Manual provisioning and configuration is time-consuming and prone to human error. With ERP moving into the cloud, a more automated environment is provided. However, new challenges related to configuration management in the cloud arise and should be addressed.

SUMMARY

A database having a plurality of standard configuration settings is provided. Requests corresponding to modifications to some or all of the standard configuration settings are monitored during customization of the database. A determination of whether the modifications are allowed is made. Based on the determination, a message comprising allowance or denial for each of the modifications is generated. Data characterizing allowed modifications is logged. The logged data is used to update the database when the standard configuration settings of the database change as part of a database upgrade.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The current subject matter provides many technical advantages. For example, by monitoring, managing, and logging a user's changes to a database system configuration as provided herein, such changes can be more readily propagated to updated versions of the database system. Requested configuration changes can be vetted before they are deployed, and successful changes can be preserved for the entire lifecycle of the database system implementation.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter relates to enhanced systems, methods, and computer program products for monitoring, managing, and logging changes to a database in an ERP system such as cloud-based ERP system. The monitoring, managing, and logging of changes by the system helps to achieve several goals related to customization of databases.

First, the system can reduce the opportunity for error. Requested configuration changes can be tracked and vetted before they are made. The system includes various stages of verification to ensure that requested changes are allowed. The system also includes the ability to revert changes once they are made if they pass some checks, but ultimately should not be allowed.

Second, the successful changes can be preserved for the entire lifecycle of the database system implementation. By identifying configuration changes that are specific to an instance of the system implemented by a user or a business and separating those changes from standard system configurations, the system can ensure that future releases of database systems account for the changes. Consequently, when a user implements a future release of a database system, most of the necessary configuration will already be complete.

Third, the user of the system can fully test the configuration changes before deploying them. The system described herein relates to a "quality" system in which a user can test and verify configuration changes. Ultimately, the user may want to deploy the changes made in the quality system to a "production" system. The system can help the user to manage when and how the deployment occurs.

Figure 1:
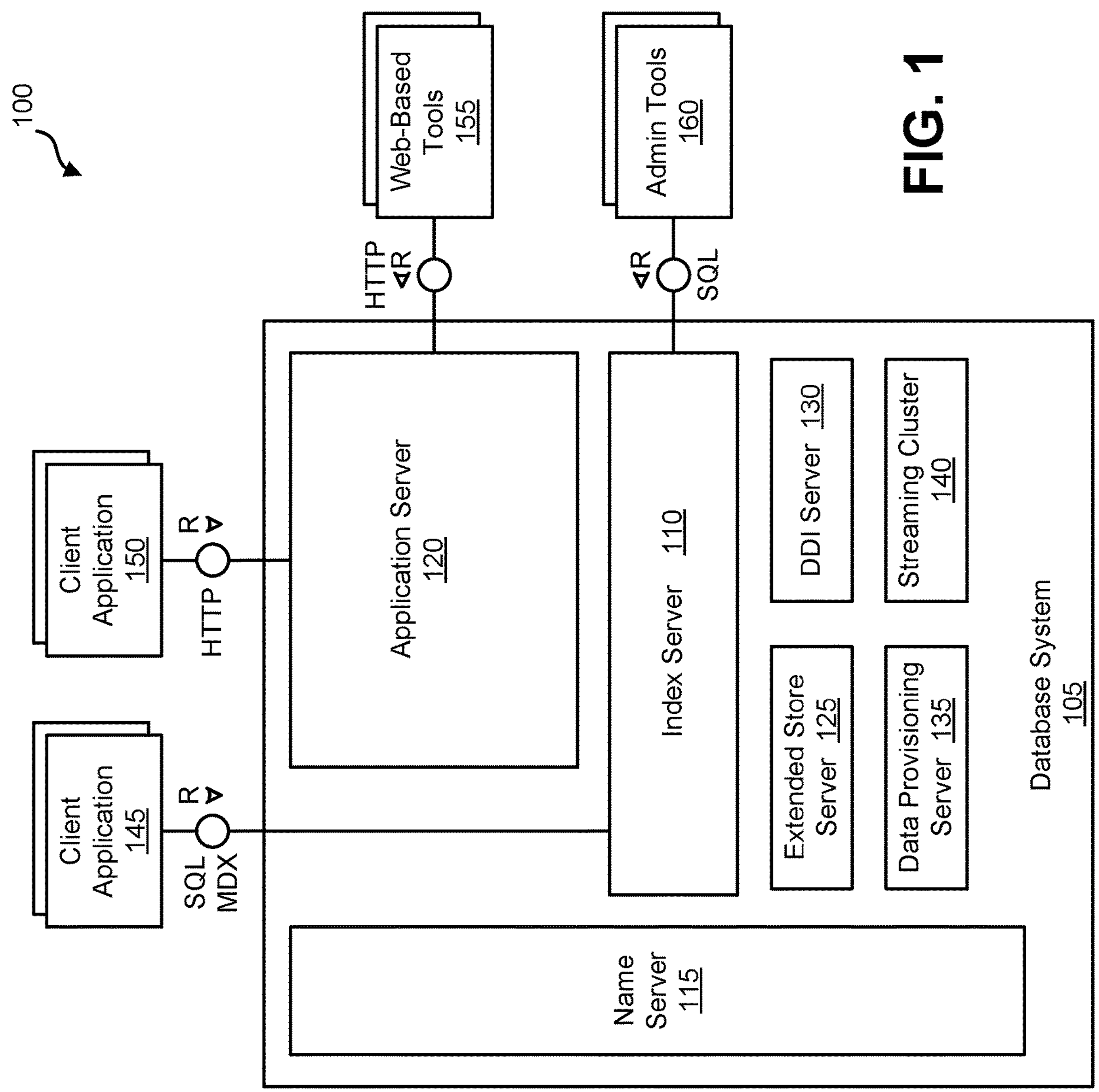
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
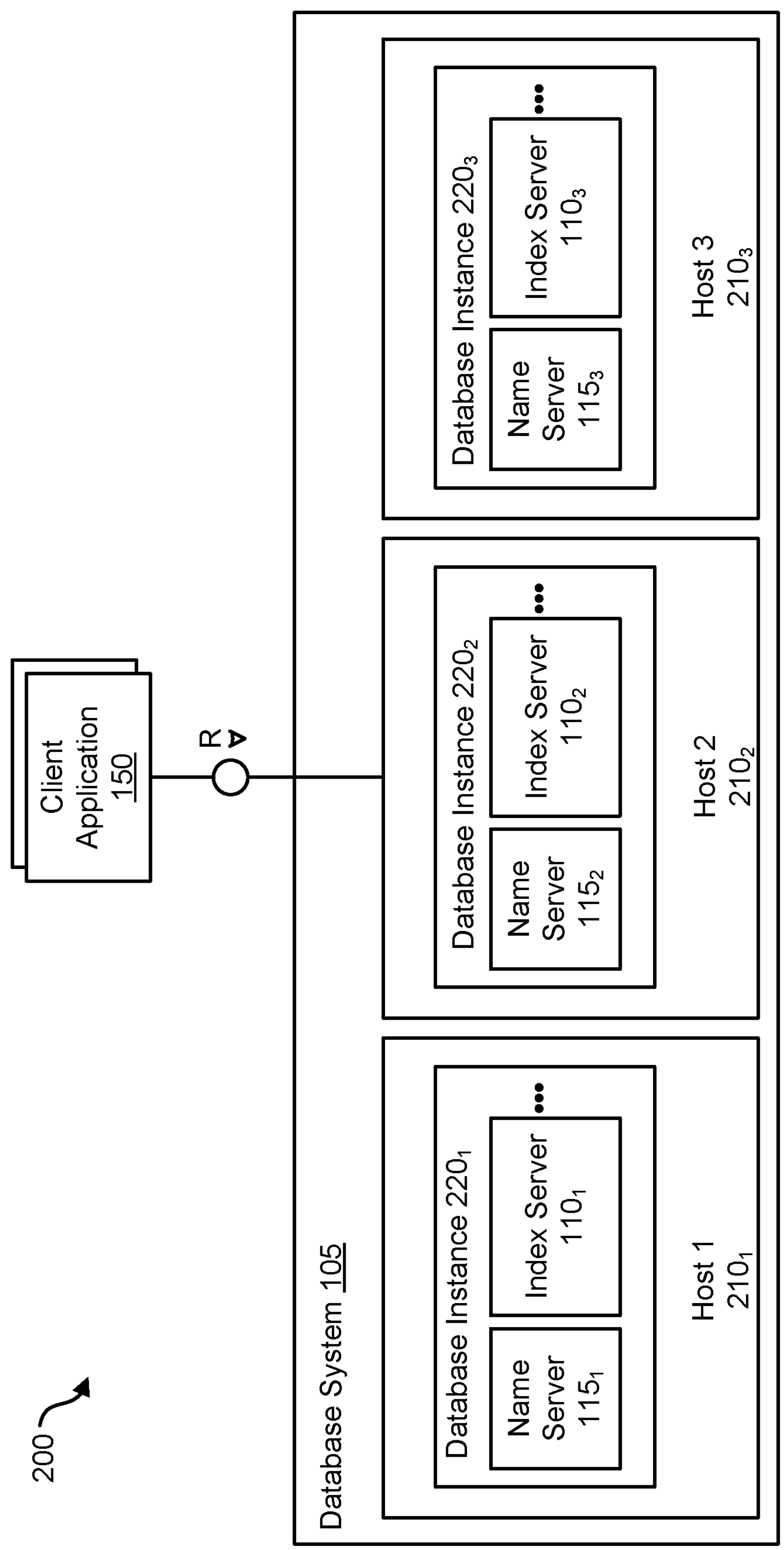
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $\mathbf{110}_{1\text{-}3}$, $\mathbf{120}_{1\text{-}3}$, in the system, if required.

As is illustrated in FIG. 2, the distributed database system 105 can be installed on more than one host $\mathbf{210}_{1\text{-}3}$. Each host $\mathbf{210}_{1\text{-}3}$ is a machine that can comprise at least one data processor (e.g., a CPU, etc.), memory, storage, a network interface, and an operation system and which executes part of the database system 105. Each host $\mathbf{210}_{1\text{-}3}$ can execute a database instance $\mathbf{220}_{1\text{-}3}$ which comprises the set of components of the distributed database system 105 that are installed on one host $\mathbf{210}_{1\text{-}3}$. FIG. 2 shows a distributed system with three hosts, which each run a name server $\mathbf{110}_{1\text{-}3}$, index server $\mathbf{120}_{1\text{-}3}$, and so on (other components are omitted to simplify the illustration).

Figure 3:
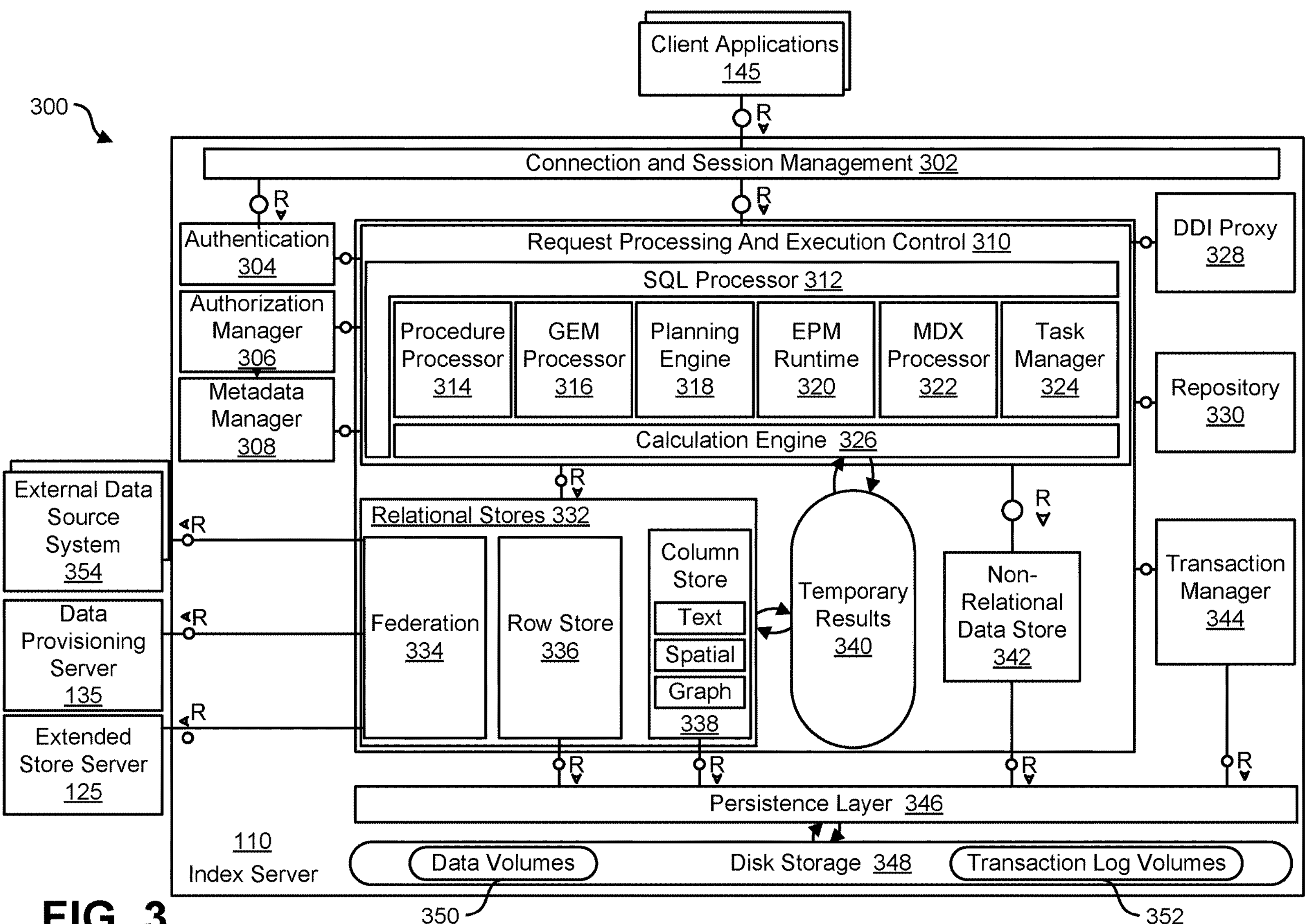
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system (s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
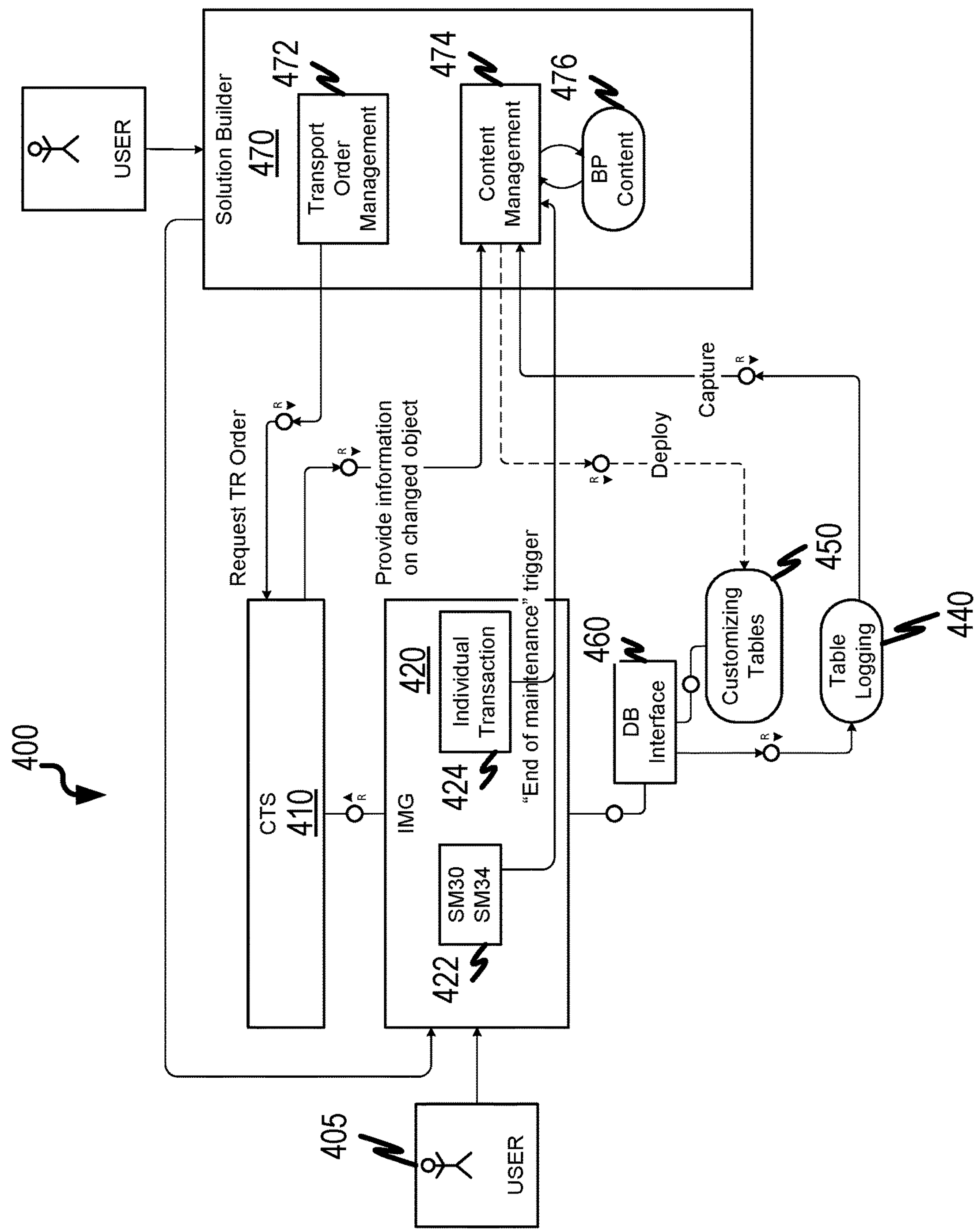
FIG. 4 is an example system architecture for use in connection with the current subject matter.

FIG. 4 is an example system architecture 400 for use in connection with the current subject matter. An implementation guide (IMG) 420 accepts a request to change one or more configuration aspects in a database from one or more users 405. The IMG 420 can provide information to the user 405 on how to customize the user's implementation of a database system, such as an ERP database system. The IMG receives the user request for processing via a graphical user interface element. The graphical user interface (GUI) element includes transactions responsible for various aspects of system configuration. For example, standard maintenance transactions 422, such as SM30 and SM34, are available to the user. SM30 corresponds to the displaying and updating of table data, while SM34 is a viewcluster maintenance call. The GUI may also include an individual transaction 424. In all, the IMG can be responsible for managing tens of thousands of implementation activities. The IMG 420 is responsible for monitoring the requests for configuration changes made in particular session. An "end of maintenance" trigger signifies the end of the session.

When the user wants to customize a particular aspect of configuration through a standard maintenance transaction 422 or an individual transaction 424, the IMG activity manager sends data to a change transport system (CTS) 410 that includes information about the changes requested by the user. The CTS 410 provides data to a content management module 474 that resides in a solution builder 470. The content management module 474 responds to a request from the CTS 410 with data that indicates whether or not a configuration change is allowed. If the requested change is allowed, it is tracked in a list of configuration changes. Reasons for denial might include that the requested modification is not allowed by the system or that it is in conflict with some predetermined content.

The CTS 410 requests a transport order from a transport order management block that resides in the solution builder 470. A transport is used to extract the requested configuration changes from the list. Each transport consists of an export process and an import process. The export process reads objects from the source system and stores them in a data file at operating system level. The import process reads objects from the data file and writes them to the database of the target system. The transport is a means to extract data from the quality system and deploy it in the production system.

The user 405 can alternatively access the IMG 420 through the solution builder 470.

The database (DB) interface 460 monitors and intercepts configuration changes requested by the user before making the changes to customizing tables 450. The customizing tables 450 may include all of part of a database or multiple databases. The DB interface 460 propagates only successful changes to the database to the table logging block 440. One advantage of the direct monitoring of changes to the database over comparing before and after images of the database is the reduction of processing overhead. Another advantage of the direct monitoring is that changes requested by a user can be distinguished from changes made by a software developer. Extracting changes by comparing before and after images of the database would not provide clarity on what entity or person made the changes.

After the user has made all of the desired changes in a session, an "end of maintenance" trigger is sent to the content management block 474 in the solution builder 470 that starts the post-processing of the configuration changes. The post-processing comprises collecting configuration changes, distinguishing them from standard configuration settings, and storing the changes in a best practice (BP) content block 476.

The BP content block 476 initially includes standard configuration settings for one or more databases. BP content may be delivered to the user or business when new versions of software are released and the quality and production systems are to be upgraded. The standard configuration settings are integrated with any changes that the user requests during the customization phase that are granted allowance by the CTS 410. The purpose of the integration is that when newer versions of the system software are deployed, the upgrade will not adversely affect the user by overwriting content that the user has already taken the time to implement. This is especially true if a new feature is present in a new release of software, and the user or business does not want to employ the new feature.

Figure 5:
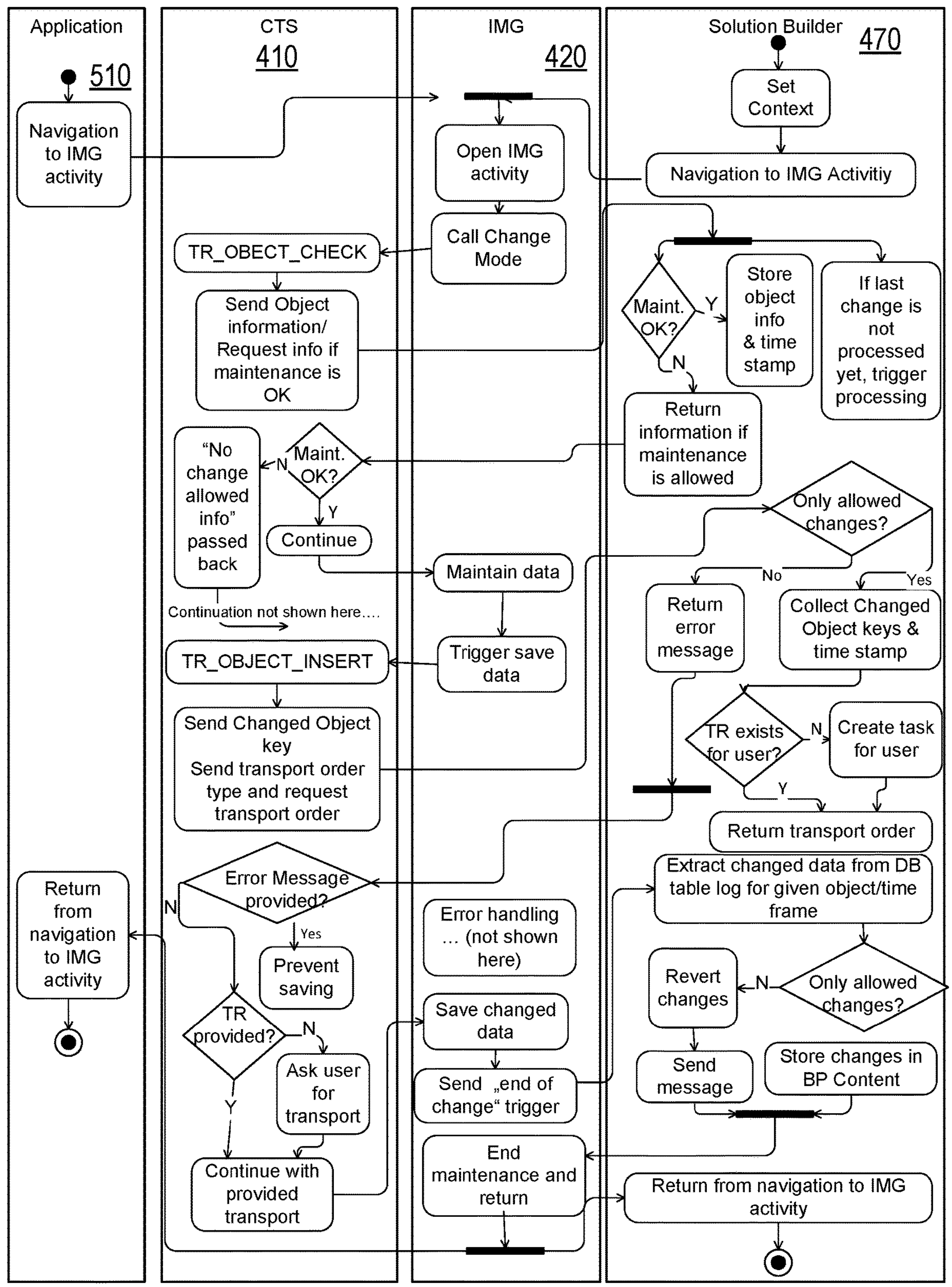
FIG. 5 is a flow chart that depicts the communication between some of the key components in a system as in FIG. 4.

FIG. 5 is a flow chart that depicts the communication between some of the key components in a system as in FIG. 4. The amount of integration points between the CTS 410 and the solution builder 470 are minimized. The streamlined communication between the CTS 410 and the solution builder 470 achieve several results, including: (i) automatic management of transports so that transport popups are eliminated; (ii) automatic verification that requested changes are allowed; and (iii) automatic verification that requested changes are not in conflict with BP content delivered by SAP/the software vendor. If the changes are in conflict, the changes can be prevented or reverted, depending on the point of detection of the conflict.

The data flow depicted in the flow chart provides an example of how the data can flow between the components depicted in FIG. 4. In this example, the application 510 can be a client application 145 or a client application 150. The user 405 can navigate to the IMG activity through the application 510 or alternatively through the solution builder 470. When the user 405 requests a configuration change, the CTS 410 will forward the request to the solution builder 470.

The solution builder 470 will return data indicating whether or not the request change is allowed. The CTS 410 will also perform a check to see if maintenance is allowed. For example, maintenance might not be allowed for the reason that the system is currently being upgraded. If maintenance is allowed, the CTS 410 will provide data to the IMG indicating the same.

The solution builder 470 is responsible for creating a transport if no suitable transport exists already. Once a transport has been provided, the changed data will be saved, and the "end of maintenance" trigger will be sent to the solution builder 470. At this point, the session will be considered ended, and either the application 510 or the solution builder 470 will return from navigation to the IMG activity.

Certain checks performed in the flow chart are repeated for each of the requested configuration changes, e.g. whether the changes are allowed. Other checks may be performed only once during a session, e.g. whether or not maintenance is allowed.

Figure 6:
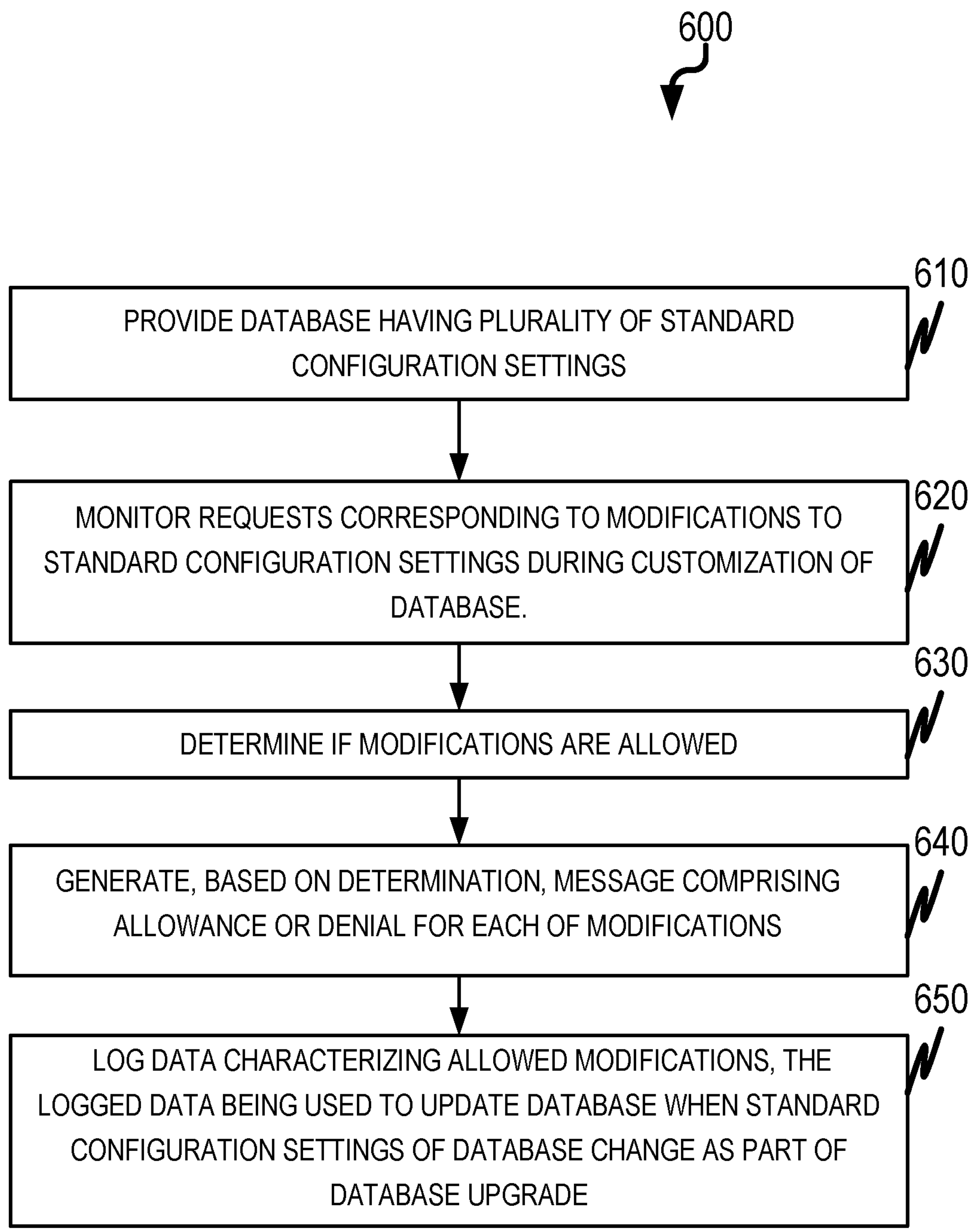
FIG. 6 is a process flow diagram illustrating techniques for database configuration change management.

FIG. 6 is a process flow diagram 600 for tracking changes to a cloud-based database. At 610, a database having a plurality of standard configuration settings is provided. Requests corresponding to modifications to some or all of the standard configuration settings during customization of the database are monitored at 620. At 630, whether modifications are allowed is determined. Based on the determination, a message comprising allowance or denial for each of the modifications is generated at 640. At 650, data characterizing allowed modifications is logged, the logged data being used to update the database when the standard configuration settings of the database change as part of a database upgrade.

One or more aspects or features of the subject matter described herein can be realized in digital electronic circuitry, integrated circuitry, application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 7:
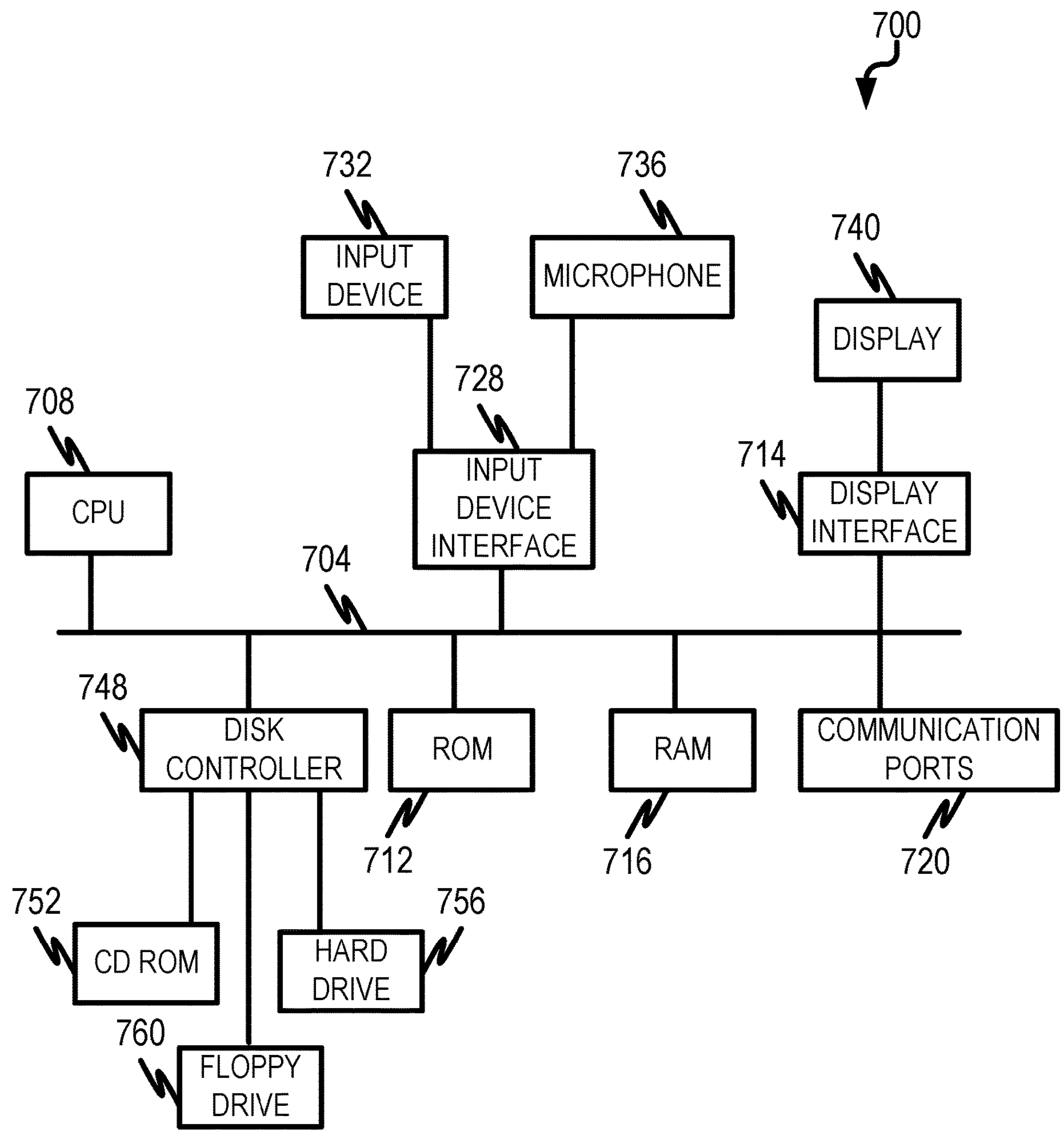
FIG. 7 is a diagram illustrating a sample computing device architecture for implementing various aspects described herein.

FIG. 7 is a diagram 700 illustrating a sample computing device architecture for implementing various aspects described herein. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM or buffer) 716, can be in communication with the processing system 708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface one or more optional disk drives to the system bus 704. These disk drives can be external or internal floppy disk drives such as 760, external or internal CD-ROM, CD-R, CD-RW or DVD, or solid state drives such as 552, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 to the user and an input device 732 such as keyboard and/or a pointing device (e.g., a mouse or a trackball) and/or a touchscreen by which the user can provide input to the computer. Other kinds of input devices 732 can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. In the input device 732 and the microphone 736 can be coupled to and convey information via the bus 504 by way of an input device interface 728. Other computing devices, such as dedicated servers, can omit one or more of the display 740 and display interface 724, the input device 732, the microphone 736, and input device interface 728.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:

providing a database having a plurality of standard configuration settings;

monitoring requests corresponding to modifications to some or all of the standard configuration settings during customization of the database;

determining, before making the modifications to the standard configuration settings of the database and without comparing database images temporally before and after receiving the modifications, if the modifications are allowed;

generating, based on the determination, a message comprising allowance or denial for each modification of the modifications;

logging data characterizing allowed user modifications, the logged data being used to preserve the allowed user modifications in future versions of the database when the standard configuration settings, of the database, change as part of a database upgrade;

determining that the modifications should be reverted; and reverting the modifications in conflict back to the standard configuration settings.

2. The computer-implemented method of claim 1, where the determining is based on whether the modifications are allowed.

3. The computer-implemented method of claim 1, where the determining is based on whether the modifications are in conflict with existing content.

4. The computer-implemented method of claim 3, further comprising:

determining that the modifications are in conflict with existing content;

generating a message indicating that the modifications will be prevented; and maintaining the standard configuration settings corresponding to the modifications in conflict.

5. The computer-implemented method of claim 1, wherein the database is a cloud-based database.

6. The computer-implemented method of claim 1, wherein data characterizing the allowed modifications is extracted from the logged data and used to generate differences between a newer version of the database and an older version of the database.

7. The computer-implemented method of claim 1, wherein the database is an in-memory database.

8. A system comprising:

one or more data processors having memory storing instructions, which when executed result in operations comprising:

providing a database having a plurality of standard configuration settings;

monitoring requests corresponding to modifications to some or all of the standard configuration settings during customization of the database;

determining, before making the modifications to the standard configuration settings of the database and without comparing database images temporally before and after receiving the modifications, if the modifications are allowed;

generating, based on the determination, a message comprising allowance or denial for each modification of the modifications;

logging data characterizing allowed user modifications, the logged data being used to preserve the allowed user modifications in future versions of the database when the standard configuration settings, of the database, change as part of a database upgrade;

determining that the modifications should be reverted; and revertinq the modifications in conflict back to the standard configuration settings.

9. The system of claim 8, where the determining is based on whether the modifications are allowed.

10. The system of claim 8, where the determining is based on whether the modifications are in conflict with existing content.

11. The system of claim 10, further comprising:

determining that the modifications are in conflict with existing content;

generating a message indicating that the modifications will be prevented; and maintaining the standard configuration settings corresponding to the modifications in conflict.

12. The system of claim 8, wherein the database is a cloud-based database.

13. The system of claim 8, wherein data characterizing the allowed modifications is extracted from the logged data and used to generate differences between a newer version of the database and an older version of the database.

14. The system of claim 8, wherein the database is an in-memory database.

15. A non-transitory computer readable storage medium storing one or more programs configured to be executed by one or more data processors, the one or more programs comprising instructions which result in operations comprising:

providing a database having a plurality of standard configuration settings;

monitoring requests corresponding to modifications to some or all of the standard configuration settings during customization of the database;

determining, before making the modifications to the standard configuration settings of the database, if the modifications are allowed, wherein the determining does not include comparing database images temporally before and after receiving the modifications;

generating, based on the determination, a message comprising allowance or denial for each modification of the modifications;

logging data characterizing allowed user modifications, the logged data being used to preserve the allowed user modifications in future versions of the database when the standard configuration settings, of the database, change as part of a database upgrade;

determining that the modifications should be reverted; and reverting the modifications in conflict back to the standard configuration settings.

16. The non-transitory computer readable storage medium of claim 15, where the determining is based on whether the modifications are allowed.

17. The non-transitory computer readable storage medium of claim 15, where the determining is based on whether the modifications are in conflict with existing content.

18. The non-transitory computer readable storage medium of claim 17, further comprising:

determining that the modifications are in conflict with existing content;

generating a message indicating that the modifications will be prevented; and maintaining the standard configuration settings corresponding to the modifications in conflict.

19. The non-transitory computer readable storage medium of claim 15, wherein the database is a cloud-based database.

20. The non-transitory computer readable storage medium of claim 15, wherein the database is an in-memory database.

* * * * *